(12) United States Patent
Palanivel

(10) Patent No.: US 11,368,579 B1
(45) Date of Patent: Jun. 21, 2022

(54) PRESENCE-BASED NOTIFICATION SYSTEM

(71) Applicant: Amazon Technologies, Inc., Seattle, WA (US)

(72) Inventor: Pranap Palanivel, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/711,879

(22) Filed: Dec. 12, 2019

(51) Int. Cl.
*H04M 3/42* (2006.01)
*G10L 15/30* (2013.01)

(52) U.S. Cl.
CPC ......... *H04M 3/42357* (2013.01); *G10L 15/30* (2013.01)

(58) Field of Classification Search
None
See application file for complete search history.

(56) References Cited

U.S. PATENT DOCUMENTS

| | | | | |
|---|---|---|---|---|
| 8,738,723 | B1* | 5/2014 | Faaborg | G06F 3/0481 709/207 |
| 10,074,371 | B1* | 9/2018 | Wang | G10L 15/30 |
| 10,251,020 | B1* | 4/2019 | Swart | G01S 5/0036 |
| 10,341,717 | B2* | 7/2019 | Adimatyam | H04N 21/43615 |
| 10,665,244 | B1* | 5/2020 | Gupta | H04W 12/06 |
| 2012/0195325 | A1* | 8/2012 | Connelly | H04L 51/14 370/432 |
| 2014/0068710 | A1* | 3/2014 | Lau | H04L 12/66 726/3 |
| 2015/0073980 | A1* | 3/2015 | Griffin | G06Q 30/00 705/39 |
| 2016/0094437 | A1* | 3/2016 | On | H04L 65/1069 370/352 |
| 2018/0182380 | A1* | 6/2018 | Fritz | H04M 7/0042 |
| 2018/0288060 | A1* | 10/2018 | Jackson | H04L 63/1408 |
| 2018/0373568 | A1* | 12/2018 | Frost | G06F 9/5044 |
| 2018/0376526 | A1* | 12/2018 | Duncan | H04L 51/14 |
| 2019/0098006 | A1* | 3/2019 | Kim | H04L 9/3226 |
| 2020/0154236 | A1* | 5/2020 | Carbune | G06N 20/00 |
| 2020/0184963 | A1* | 6/2020 | Joseph | G06F 3/167 |
| 2020/0265835 | A1* | 8/2020 | Ni | G10L 15/08 |

* cited by examiner

*Primary Examiner* — Ernest G Tacsik
(74) *Attorney, Agent, or Firm* — Pierce Atwood LLP

(57) ABSTRACT

Techniques for notifying multiple recipient devices of a communication request are described. The system may determine a score corresponding to each of the recipient devices and may notify the devices based on the score. The system may cause a first recipient device to output a notification for the communication request for a duration of time. After the duration of time elapses, the system may cause a second recipient device to output a notification for the communication request.

21 Claims, 14 Drawing Sheets

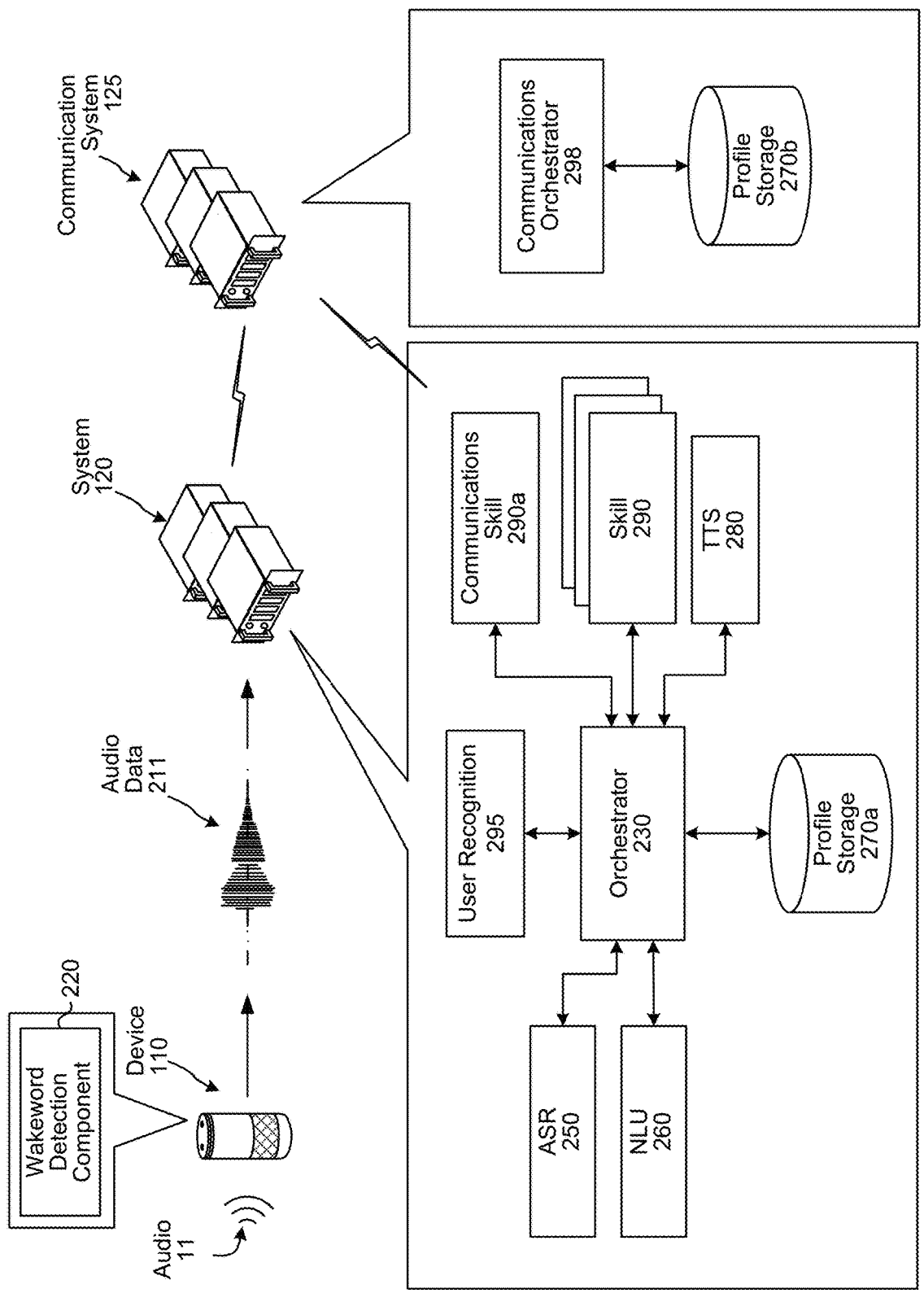

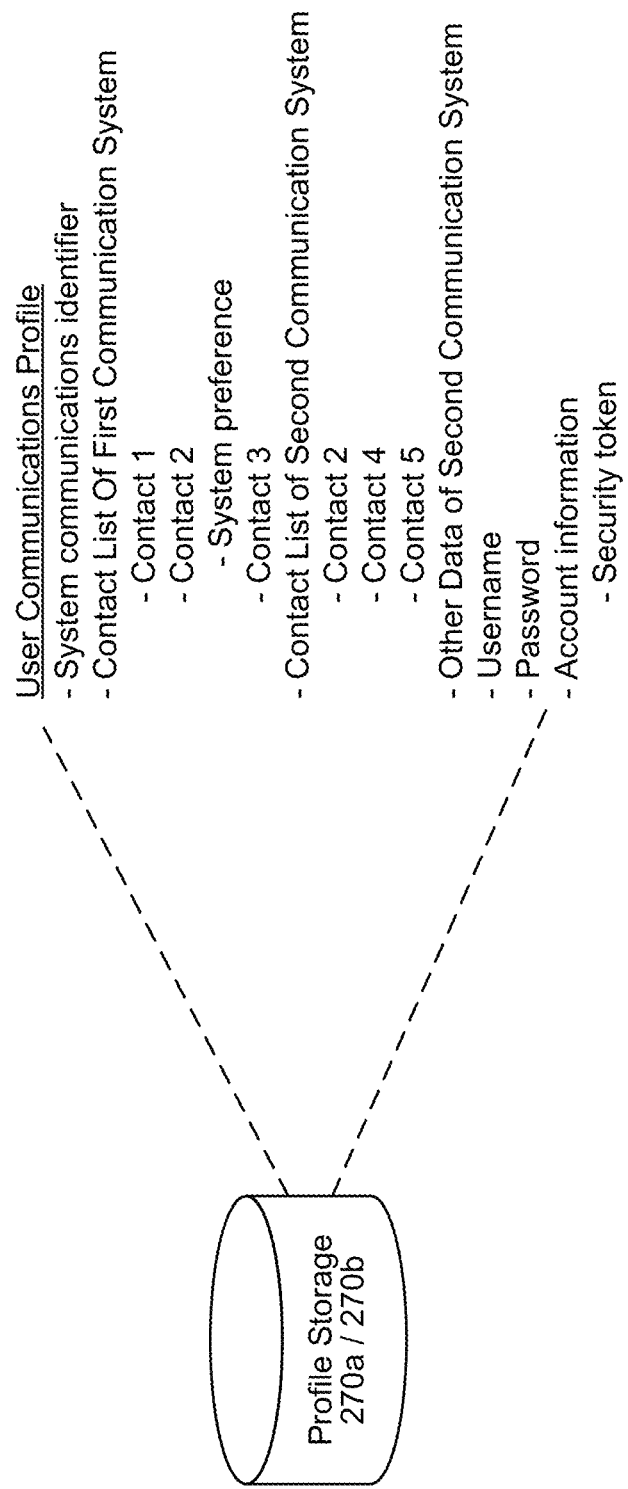

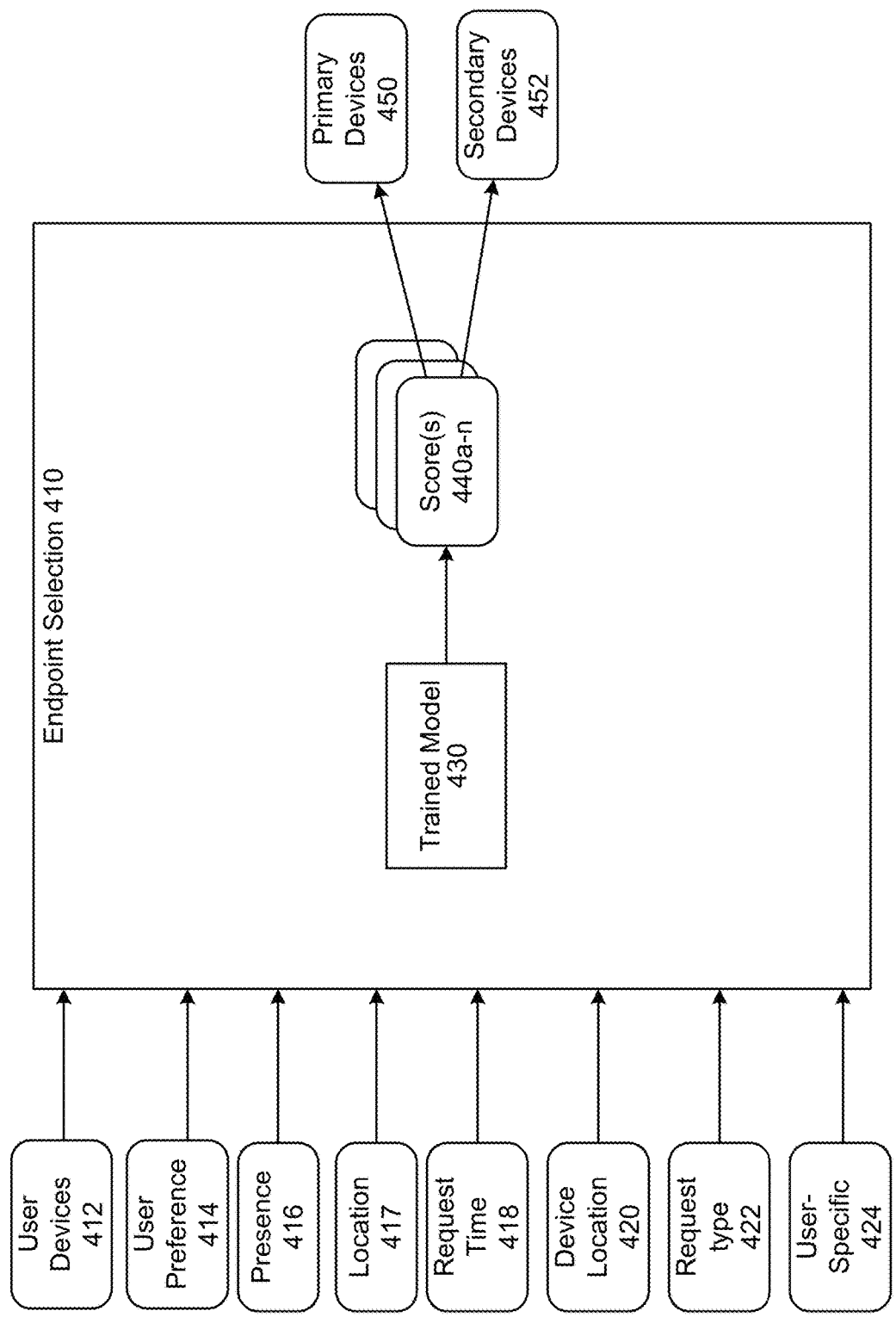

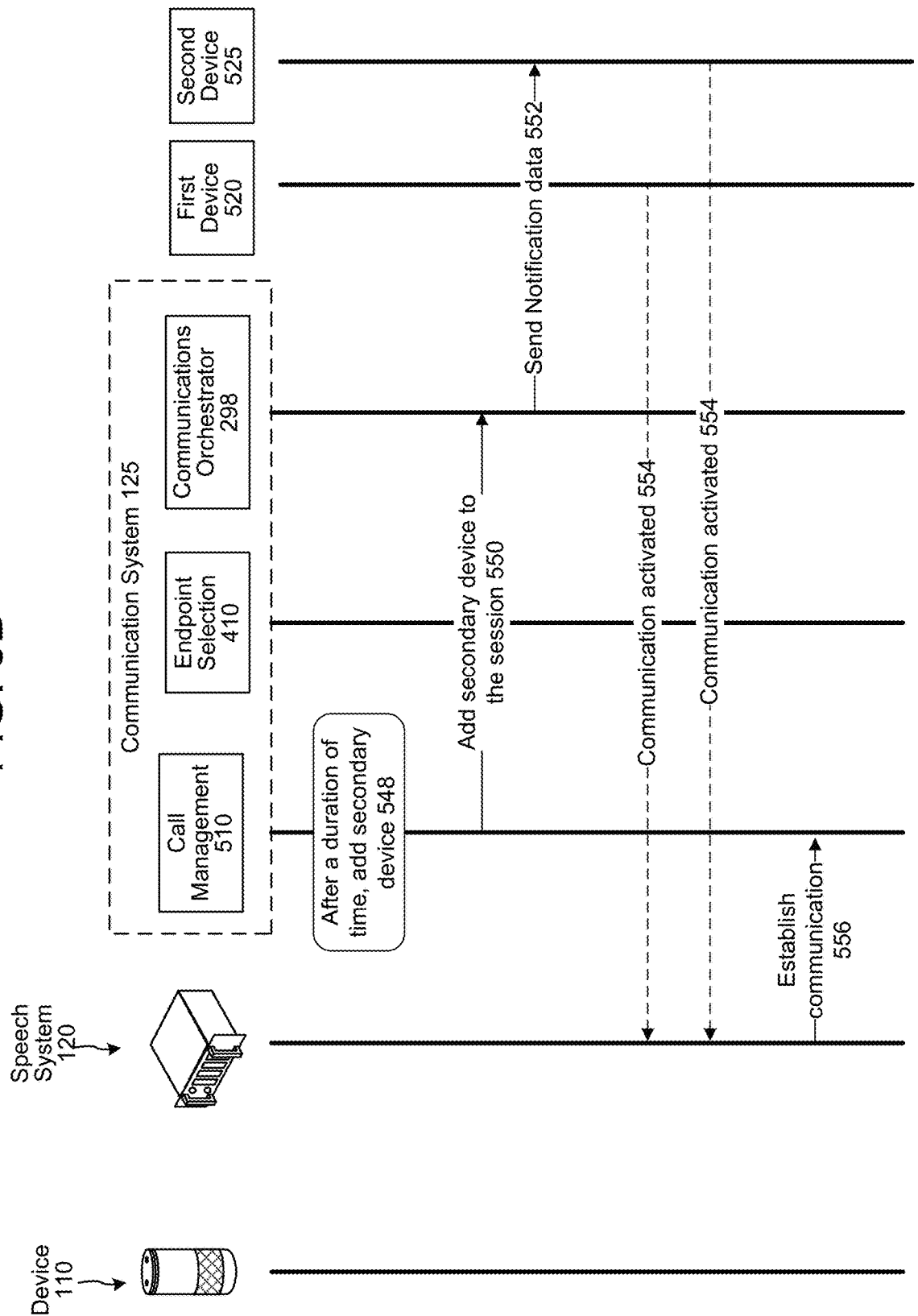

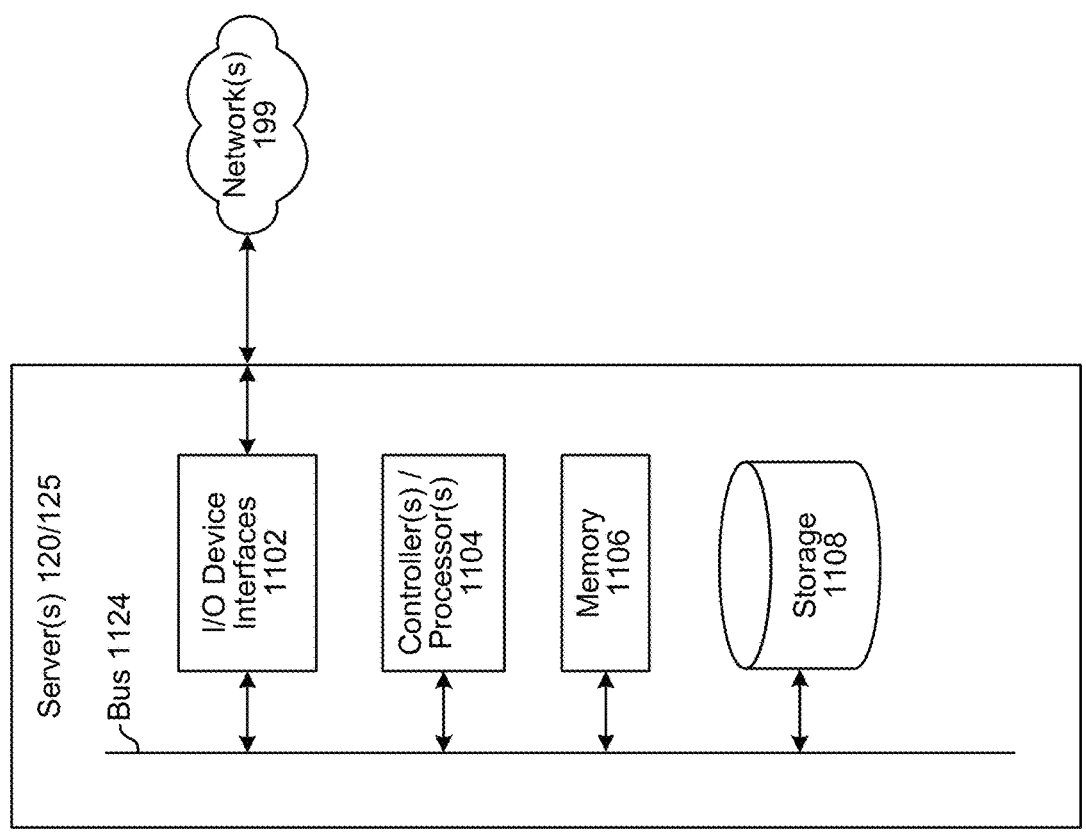

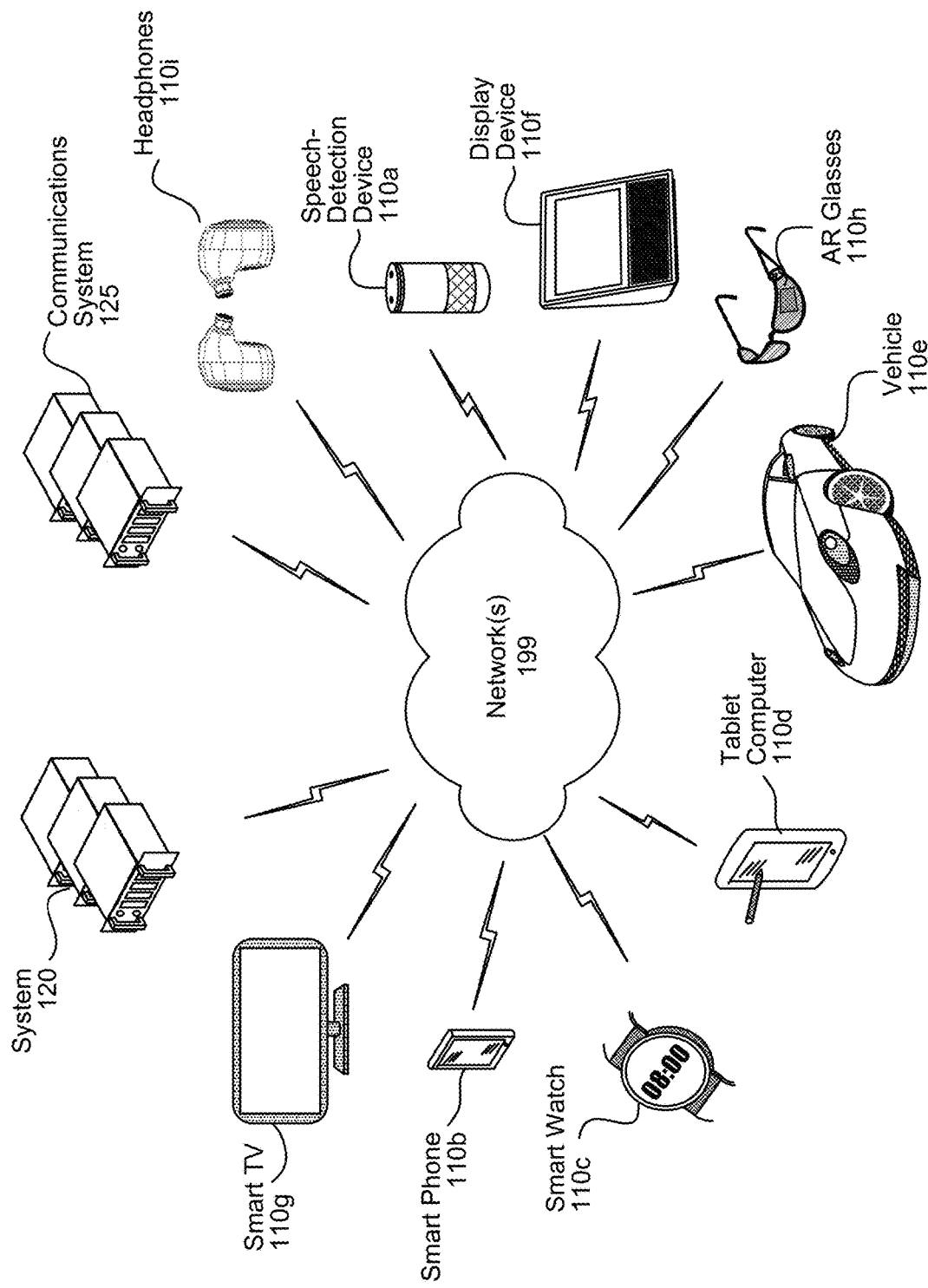

PRESENCE-BASED NOTIFICATION SYSTEM

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of computing devices to perform tasks based on the user's spoken commands. The combination of speech recognition processing and natural language understanding processing techniques is referred to herein as speech processing. Speech processing may also involve converting a user's speech into text data which may then be provided to skills. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2 is a conceptual diagram of components of a system according to embodiments of the present disclosure.

FIG. 3 is a conceptual diagram of a user's communications profile according to embodiments of the present disclosure.

FIG. 4 is a conceptual diagram of the components of an endpoint selection component according to embodiments of the present disclosure.

FIGS. 5A and 5B illustrate an example of signaling to incrementally send notifications to a user's devices according to embodiments of the present disclosure.

FIG. 11 is a block diagram conceptually illustrating example components of a system according to embodiments of the present disclosure.

FIG. 12 illustrates an example of a network of devices according to embodiments of the present disclosure.

DETAILED DESCRIPTION

Figure 1:
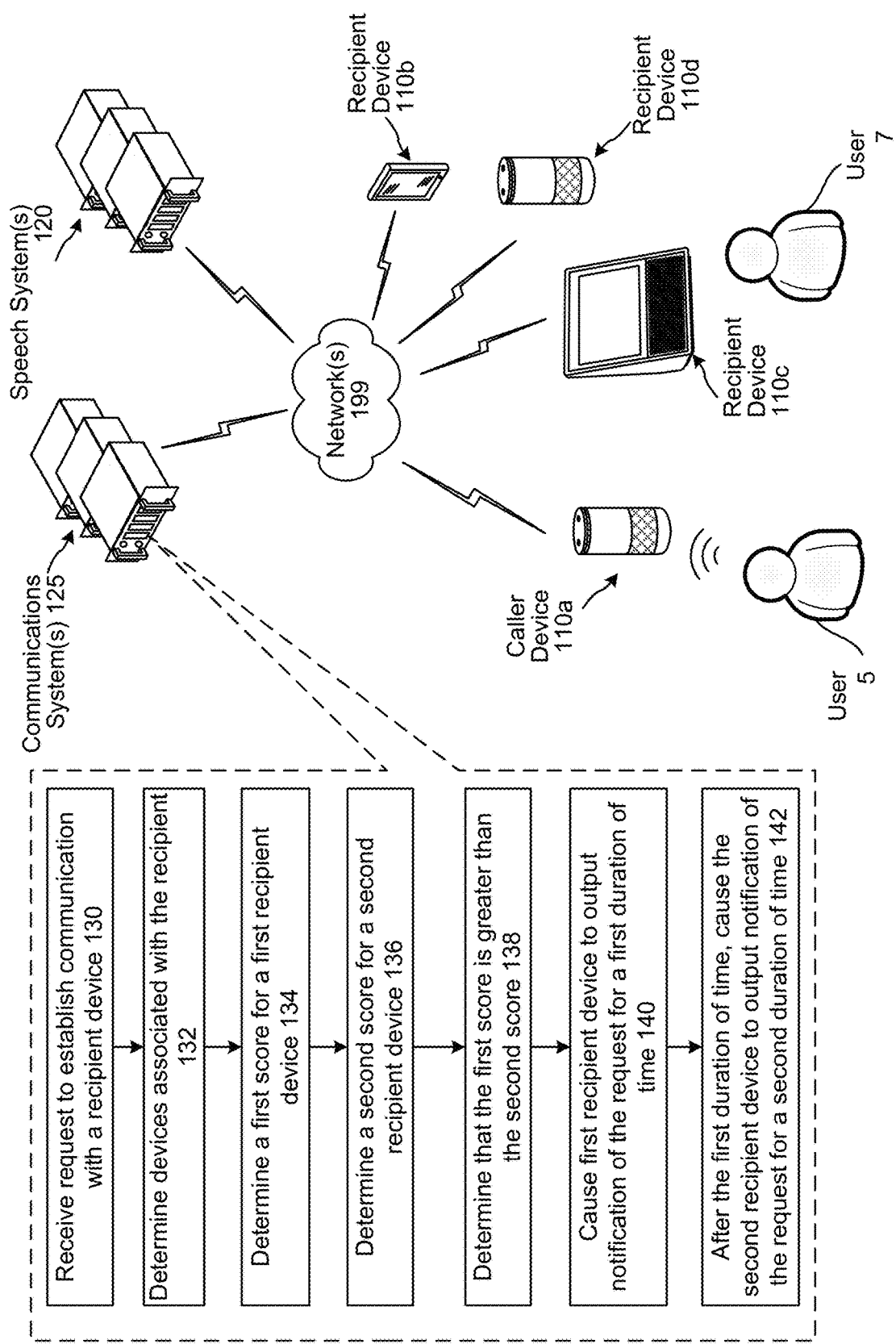
FIG. 1 is a conceptual diagram of a system configured to determine user devices to send a notification according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

Certain systems may perform actions in response to user inputs, which may originate as user speech. For example, a system may output weather information in response to a user input corresponding to "Alexa, what is the weather today." For further example, a system may play the song Africa by Toto in response to a user input corresponding to "Alexa, play Toto music." In another example, a system may book a ride with a ride sharing service in response to a user input corresponding to "Alexa, book me a ride to the airport."

Certain systems may include communications functionality that enable users to send messages to other users as well as perform calls with other users. For example, if a user speaks "Alexa, tell John I am on my way" to a system device, the system may send a message to "John" with the message's content corresponding to audio of "I am on my way" and/or a text transcription thereof (i.e., a one-way communication session). For further example, if a user says "Alexa, call John" to a system device, the system may establish a two-way communication session between the system device and a device associated with "John."

Users often have multiple devices in their home, vehicle, work or otherwise near them, and they may use any of those devices to answer calls, receive notifications, or for other type of communications. While ringing or otherwise notifying all the user's devices of an incoming communication request can be an undesirable experience, only notifying some of the user's devices may cause the user to miss the request (for example, if the user is not near the ringing device) or the request may be answered by another person that the communication was not intended for (for example, another person in the home that is near the ringing device may answer the call).

The present disclosure describes a system that causes a user's first device to output a notification for a communication request for a duration of time (e.g., 5 seconds), then cause a user's second device to output the notification for a duration of time if the user does not answer the request via the first device, then cause a third device to output the notification if the user does not answer the request via the second device, and so on. The system, in this manner, incrementally notifies the user's devices for a duration of time. The system determines which device to notify first based on which device the user is most likely to answer or otherwise view the notification. The system may use presence data indicating which device the user is likely near when a communication request is received. The system may use the device's location and the time of call to determine which device to notify first. The system may also use other information related to the user's (callee) profile, the user (caller) requesting to communicate with the callee, the type of communication request, the callee device type, and the like.

As used herein, a caller refers to a user that initiates a communication request with another one or more users. As used herein, a callee or recipient refers to a user that the caller is attempting to communicate with.

The present disclosure may provide a more desirable experience by increasing the likelihood of a call being answered by a callee, reducing the wait time for a caller, reducing the number of devices ringing (e.g., at the same time, in total before call is answered, etc.) in the callee's household, increasing the chances that the call is answered by the intended callee, and also reducing the likelihood of disturbing other persons in the callee's household.

FIG. 1 illustrates a system configured to determine user devices to send notifications. Although the figures and discussion of the present disclosure illustrate certain operational steps of the system in a particular order, the steps described may be performed in a different order (as well as certain steps removed or added) without departing from the intent of the disclosure. A first device 110*a* of a user 5, multiple devices 110*b*, 110*c* and 110*d* of a user 7, one or more systems 120, and one or more communications systems 125 may communicate across one or more networks 199. The user 5 may be a caller or sender that uses the device 110*a* to provide a user input to initiate communication with or to send a communication to the user 7. The user 7 may be a recipient, and the devices 110*b*-110*d* may be associated with the user's 7 profile. The communications system 125 may be configured, as described below, which of devices 110*b*-110*d* of the user 7 to notify and when to notify them.

The below description describes the steps of FIG. 1 being performed by the system 125. One skilled in the art will appreciate that the system(s) 120 may perform some or all the steps described with respect to FIG. 1 without departing from the present disclosure.

The communications system(s) 125 receives (130) a request to establish communication with a recipient device. The user 5, via the caller device 110*a*, may provide the request to the communications system(s) 125. In some embodiments, the input (voice, text or other forms of input) from user 5 may be provided to the system(s) 120 (which may be a speech processing system) for processing, and the system(s) 120 may determine that the user 5 intends to communicate with the user 7. The system(s) 120 may route the communication request to the communications system(s) 125 for further processing. The communication request may be a request to establish two-way communication (e.g., audio call, video call, VoIP, or other type of two-way communication) between the caller device 110*a* of user 5 and one of the recipient devices of user 7. The communication request may be a request to send a text message, SMS message, voice message, email message, or other types of communications to a recipient device(s) of the user 7.

The communications system(s) 125 determines (132) the devices associated with the recipient. The communications system(s) 125 may determine device identifiers, device name and other information corresponding to the devices that are associated with the user 7 from profile storage 270. For example, the communications system(s) 125 may determine that the device 110*b*, device 110*c* and device 110*d* are associated with the recipient/user 7 that the user 5 intends to communicate with.

The communications system(s) 125 determines a score corresponding to the recipient devices. For example, the communications system(s) 125 determines (134) a first score corresponding to a first recipient device (e.g., 110*b*) and determines (136) a second score corresponding to a second recipient device (e.g. 110*c*). The communications system(s) 125 may also determine a third score, for example corresponding to device 110*d*. The scores may indicate a likelihood of the user 7 answering, accepting, viewing, or otherwise responding to the request to establish communication. The score may be based on various factors, as described in detail with relation to FIG. 4. For example, the score may be based on presence data indicating a probability or likelihood that the user 7 is proximate to the respective device. The score may be based on presence data indicating a distance metric corresponding to how close the user 7 is to a respective device. The score may be based on the location of the device and/or the time the request is received. The score may be determined by the communications system(s) 125 when the request to communicate with the recipient user 7 is received. The communications system(s) 125 may use a machine-learning model to determine the score. In some embodiments, the communications system(s) 125 may use a combination of a machine learning model(s) and a rule-based model(s) to determine the score, where some of the data may be processed using the machine learning model and the other data may be processed using the rule-based model.

The communications system(s) 125 selects the recipient device with the highest score. For example, the communications system(s) 125 determines (138) that the first score for the first recipient device 110*c* is greater than the second score for the second recipient device 110*d*. In some embodiments, the communications system(s) 125 may determine a ranked list of recipient devices based on their respective scores.

The communications system(s) 125 determines which recipient device to first cause to output the notification for the communication request (for example, by causing the recipient device to ring or otherwise output a notification (audible and/or visual). For example, the communications system(s) 125 causes (140) the first recipient device (e.g., 110*c*) to output a notification of the request to establish communication. The notification is outputted for a first duration of time (e.g., 5 seconds). After the first duration of time elapses, the communications system(s) 125 causes (142) the second recipient device to output a notification (e.g., ring) of the request to establish communication. The communications system(s) 125 may select the second recipient device to ring next based on the second score being the second highest of all the scores for the recipient devices or the second score being the next highest score compared to the first score. The communications system(s) 125 may cause the second recipient device to output the notification for a second duration of time. After the second duration of time elapses, the communications system(s) 125 may cause another recipient device (the one with the next highest score or third best score) to output a notification of the request to establish communication. In some embodiments, the communications system(s) 125 may continue to cause the first device to output the notification while causing the second device to output the notification. In other embodiments, the communications system(s) 125 may cause the first device to stop outputting the notification, while or before causing the second device to output the notification.

In some embodiments, the communications system(s) 125 may initiate a session, associated with a session identifier, to identify and track the communication request from user 5 to the user 7. To cause the first recipient device to output the notification, the communications system(s) 125 may add the first callee device (or an identifier corresponding to the first recipient device) to the session. To cause the second recipient device to output the notification after the first duration of time, the communications system(s) 125 may add the second recipient device (or an identifier corresponding to the second recipient device) to the session after the first duration of time elapses.

In some embodiments, the communications system(s) 125 may determine a primary group of recipient devices and a secondary group of recipient devices, where the primary group of recipient devices includes recipient devices with a score that are above or meet a threshold value, and the secondary group includes recipient devices with a score that below a threshold value. The communications system(s) 125 may cause the primary group of recipient devices to ring or otherwise output the notification for a duration of time. That is, multiple devices of the primary group may ring at the same time to notify the user 7 of an incoming communication request (e.g., a call). After the duration of time elapses, the secondary group of recipient devices may be caused to output a notification.

After the recipient/user 7 answers, accepts, views, ignores or otherwise acknowledges the request to establish communication via one of the recipient devices (e.g., 110*b*, 110*c* or 110*d*), the communications system(s) 125 causes the recipient devices to stop outputting the notification, and establish the communication between the caller device 110*a* and the recipient device (e.g., 110*c*) that the user 7 uses to acknowledge the communication request.

The recipient/user 7 may acknowledge the communication request using voice input, text input, or other forms of inputs. In some embodiments, in the case of a voice input the system(s) 120 may process the input using ASR and/or NLU to determine the user's 7 intention to accept, ignore or otherwise acknowledge the communication request.

The communications system(s) 125 may store data indicating which recipient device was used to acknowledge the communication request, the time the request was received, the location of the recipient device that was used to acknowledge the communication request, whether the request was accepted or ignored, the identity of the caller, and other information. Such data may be used by the communications system(s) 125 to determine or update the score corresponding to one or more recipient devices.

In some embodiments, the communications system(s) 125 may hold delivery of an asynchronous message notification (e.g., email, text message, etc.) until the intended recipient/user 7 is near a particular device, to increase the likelihood of the user 7 receiving or viewing the notification. The communications system(s) 125 may hold delivery of certain message notifications based on the content of the message. For example, the system(s) 125 may hold delivery of a message with a picture/video until the user 7 is near a device capable of displaying image data (e.g., an Echo Show, a TV, a tablet, etc.), while a message with text and/or audio content may be held until the user 7 is near a device capable of presenting text or audio message (e.g., Echo Buds, mobile device, etc.).

In some embodiments, the communications system(s) 125 may also determine which recipient device to notify based on the device being located in a private environment of the recipient or a public environment. For example, a notification for a message from a personal contact of the recipient may be sent to a personal device of the user 7 located in the user's private room or private office, instead of a device located in the common areas of the user's home or the user's workplace.

The system may operate using various components as described in FIG. 2. The various components may be located on same or different physical devices. Communication between various components may occur directly or across a network(s) 199.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the system 120 and/or may be provided by the user 5.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may wake and begin transmitting audio data 211, representing the audio 11, to the system 120. The audio data 211 may include data corresponding to the wakeword, or the portion of the audio data 211 corresponding to the wakeword may be removed by the device 110 prior to sending the audio data 211 to the system 120.

Upon receipt by the system 120, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent representing an action that a user desires be performed as well as pieces of the input text data that allow a device (e.g., the device 110, the system 120, the communications system 125, etc.) to execute the intent. For example, if the text data corresponds to "call John," the NLU component 260 may determine an intent that the system establish a two-way communication channel between the device 110 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the system 120 that is akin to a software application running on a traditional computing device. That is, a skill component 290 may enable the system 120 to execute specific functionality in order to perform one or more actions (e.g., provide information to a user, display content to a user, output music, or perform some other requested action). The system 120 may be configured with more than one skill component 290. For example, a weather skill component may enable the system 120 to provide weather information, a ride sharing skill component may enable the system 120 to schedule a trip with respect to a ride sharing service, a restaurant skill component may enable the system 120 to order food with respect to a restaurant's online ordering system, a communications skill component may enable the system to perform messaging or multi-endpoint communications, etc. A skill component 290 may operate in conjunction between the system 120 and other devices such as the device 110 or a communications system 125 in order to complete certain functions. Inputs to a skill component 290 may come from various interactions and input sources. The communication system 125 may include a communication orchestrator component 298 for orchestrating communication with the system 120 and/or device(s) 110.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the system 120 (as illustrated in FIG. 2) or may be located at whole (or in part) with one or more separate systems. Unless expressly stated otherwise, reference to a skill, skill device, or skill component may include a skill component operating within the system 120 (for example as skill component 290) and/or skill component operating within a system separate from the system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill.

The system 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system 120 may include profile storage 270a and/or the communication system 125 may include profile storage 270b. The profile storage 270a/270b may include a variety of information related to individual users, groups of users, etc. that interact with the system. The profile storage 270a/270b may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270a/270b may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located. Permissions may be obtained from a user associated with the caller device and recipient device 110, or other devices discussed herein.

The system 120 may include a user recognition component 295 that recognizes one or more users associated with data input to the system. The user recognition component 295 may take as input the audio data 211 and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art. Output of the user recognition component 295 may include a single user identifier corresponding to the most likely user that originated the present user input. Alternatively, output of the user recognition component 295 may include an N-best list of user identifiers with respective scores indicating likelihoods of respective users originating the present user input. The output of the user recognition component 295 may be used to inform NLU processing as well as processing performed by other components of the system.

FIG. 3 illustrates an example communication profile of a user stored in a communication profile storage 270a/270b. The communication profile storage 270a/270b may, as described above, be implemented as part of the communication system 125 or the system 120.

When a user enables or signs up for communication functionality of the system, the system may generate a communication profile identifier specific to the user. The user may validate their phone number, address, or other information with the system. For example, the user may input their phone number to the system, and the system may then validate the phone number with a cellular service provider. Once validated, the system may store the phone number in the user's communication profile (e.g., the system may associate the user's phone number with the user's communication profile identifier).

The system may output a prompt to the user. The prompt may be displayed on a screen of the device 110 as text and/or output as audio by the device 110. The prompt may ask whether the user wants to import their contact list (e.g., a contact list stored on the device 110) to the system. If the user responds affirmatively, the system may import the contact list to the user's communication's profile in the communication profile storage 270a/270b (e.g., the system may associate the user's contact list with the user's communication profile identifier). Alternatively, the system may import the contact list to a different storage (implemented as part of the communication system 125 or the system 120), and associate the stored contact list with the user's communication profile identifier via a contact list identifier.

The system may also prompt the user as to whether the user wishes to only import their contacts when their device is associated with another device of the system. This may allow the user's contact data to become associated with the system during a communication with another system device (e.g., a Bluetooth pairing between a smartphone and a vehicle) and allow the contact data to become disassociated when the connection is dropped. Further, when the communication resumes (or when communication begins with a different first device/vehicle that the user may not have been in before but may be part of the system for which permissions have been given), the system may associate the user's contact data with the first device/vehicle without the user having to go through a manual contact ingestion each time.

The user may also validate various communication identifiers with the system. The various communication identifiers may correspond to different modalities of communication. Moreover, the communication identifiers may be associated with different communication systems. The system may validate and store the communication identifiers in the user's communication profile (e.g., may associate each of the user's validated communication identifiers with the user's communication profile identifier). For example, the user may send messages and/or perform calls via the internet using an internet-based communication system. For further example, the user may send messages via a messaging application downloaded on the device 110. The user may provide the system with their communication identifier of a communication system (different from the communication system described herein), the system of the present disclosure may validate the user's communication identifier with the communication system, and may thereafter store the user's communication identifier in the user's communication profile (e.g., associate the validated communication identifier with the user's communication profile identifier), along with a representation of the communication system associated with the communication identifier.

As illustrated in FIG. 3, a user's communication profile identifier may be associated with various communication identifiers of the user. When the user provides the system with a communication identifier to validate, the user may also provide the system with permission to import a first contact list associated with the user's communication identifier. The user may perform communication using various communication sources. Each communication source may store a respective contact list for the user. The user's communication profile identifier may be associated with the contact lists of each communication source the user permitted to be imported. As illustrated in FIG. 3, each contact list may be associated with the communication source from which it was imported. Alternatively, the system may be configured to conglomerate all of the user's imported contact lists into a single contact list associated with the user's communication profile identifier.

The user profile may further include information regarding the second communication system, including a second contact list associated with the second communication system. The first contact list and the second contact list may include common contacts, such as "Contact 2," as illustrated in FIG. 3. The first contact list may also include contacts not present in the second contact list, such as "Contact 1" and "Contact 2," as illustrated in FIG. 3. The second contact list may include contacts not present in the first contact list, such as "Contact 4" and "Contact 5," as illustrated in FIG. 3. As explained further herein, if the first user wishes to communicate with a contact present in only one contact list, such as "Contact 1" or "Contact 4," the system 120 may attempt to establish communication using only the corresponding communication system. If, however, the first user wishes to communicate with a contact present in both the first contact list and the second contact list, the system 120 may select one or both communication systems to attempt to establish communication.

FIG. 4 is a conceptual diagram of the components of an endpoint selection component according to embodiments of the present disclosure. The endpoint selection component 410 is included at the communications system(s) 125 and is configured to determine scores corresponding to the recipient devices. The endpoint selection component 410 may receive multiple signals/data relating to the recipient/user 7, the caller/user 5, the communication request, etc. The endpoint selection component 410 may employ a trained model/trained machine learning model 430 to process various data and determine a score corresponding to the recipient devices. The data received by the endpoint selection component 410 may include, but is not limited to, recipient devices data 412, user preference data 414, presence data 416, location data 417, request time data 418, device location data 420, request type data 422, and user-specific data 424.

The recipient devices data 412 may identify one or more devices associated with the recipient/user 7 using the data stored at profile storage 270b. The recipient devices data 412 may include device identifiers, device type information, device capabilities (e.g., audio only, video, etc.), device location, and other information related to the recipient devices. The device location may indicate the location of the recipient device within a household, for example, the kitchen, the bedroom, the hallway, the home office, etc. The device location may be determined using information provided by the user (such as, location or device name). The device location may be determined using GPS or other sensors associated with the device.

The user preference data 414 may identify recipient preferences with respect to receiving communication requests. The user preference data 414 may indicate the recipient preference with respect to receiving communication requests from particular callers. For example, the recipient may prefer to answer a call from a work contact on the recipient mobile device/smartphone that may be designated as a work device. As another example, the recipient may prefer that a call from a family member is answered by anyone in the household and the system may ring the devices in the household so that multiple persons in the household are notified of the incoming call. The user preference data 414 may indicate the recipient preference with respect to the time of the communication request. For example, if a call is received at night, the recipient may prefer that the devices in the bedroom ring.

The presence data 416 may include information relating to presence events, where the presence event provides an indication that a user may be in a particular location and/or available to acknowledge a communication request using a particular recipient device. The presence data 416 may indicate a likelihood of the recipient being physically proximate to a recipient device. The presence data 416 may be determined using various methods and data, including but not limited to, Bluetooth beacons, geofencing, GPS, motion sensors, computer vision, speaker identity, and others. The speaker identity may be determined by the system(s) 120 by processing a user's speech to identify the speaker as described in relation to the user recognition component 295 of FIG. 2. The endpoint selection device 410 may determine the score 440 corresponding to the recipient device based on the presence data 416.

Presence events may be generated by various device(s) that a user may interact with. Such presence event(s) may be generated based at least in part on an interaction between the user and a device, or an interaction between two or more devices. In some example embodiments, presence event data may be generated by a device based on a user interacting with his/her user device. For example, if a user speaks a wakeword and a voice-controlled device that is known to be associated with a particular location is activated, then the voice-controlled device may register a presence event that is indicative of the user's location at a particular place (e.g., home, office, car, etc.) where the device that registered the presence event is located. As another example, if a user's mobile device (e.g., smartphone, tablet, etc.) connects with a particular Wi-Fi access point, then a presence event may be generated by the mobile device and/or the access point. As yet another example, if a smart lock on a door to a user's house is activated (e.g., unlocked), then the unlocking action may be used as the basis for generating presence event data indicating the user is at home or is entering the home.

Further example device(s) and/or activities that may cause the generation of presence event(s) include interactions with: smart appliances (e.g., opening/closing a refrigerator door or stove door, operating a microwave, etc.), a desktop or laptop computer, global satellite navigation system (e.g., global positioning satellite (GPS) system), smart motion sensors, home monitoring and other types of cameras, smart thermostats, systems installed in a vehicle, and the like. Additionally, a variety of mechanisms may be employed for generating presence events, such as facial recognition, ASR, fingerprint recognition, or other types of identification techniques. Any suitable action or function associated with a user and performed by a device may generate presence-event notification data. Such actions may be active interactions with a user, passive detection of the user, and/or pre-programmed actions or functions performed with one or more other user devices.

Once a device generates a presence event, it may send an indication of the presence event, or a presence-event notification, to the system(s) 120. In some cases, the presence-event notifications may be tagged (e.g., metadata, message attachments, etc.) with a user identifier associated with one or more users (e.g., an individual, a family, a household, any combination of roommates, etc.). In other cases, the presence-event notifications may not be tagged with a user identification, but may instead be tagged with an identifier for the reporting device that may be associated with a particular user identification, group of user identifications, a user, and/or a group of users. In some cases, a particular device may be associated with more than one user and/or user identifiers. For example, a smart microwave oven that may detect, generate and transmit a presence-event notification upon user interaction (e.g., opening/closing the microwave oven door, etc.), may report such an event as associated with any of the users within the household (e.g., associated with a husband's user identifier, a wife's user identifier, and/or one or more children's user identifiers). Alternatively, or in addition, all the users in the household may have a single user identifier that may be tagged to any presence-event notifications produced by the smart microwave oven for example. In embodiments where a user identifier may not be provided with presence-event notification(s), a user and/or user identification may be identified by the system(s) 120 of the presence-event notification(s) based on various information, such as the device that transmitted such a presence event.

In some example embodiments, a remote server may generate presence event notifications associated with a user. For example, a user logging into a social media account, an email account, or any type of login and/or user identifying event may be used by a remote server to generate a presence event notification. As another example, when a particular website is accessed from a particular device, the website may be configured to identify the user and/or device and generate a presence event notification that indicates the device has accessed the website, along with any other suitable information (e.g., user identifier, user activity, etc.).

The location data 417 may indicate the recipient's location. Based on the recipient's location, the score 440 corresponding to one or more recipient devices that are located near the recipient may be higher than the devices are not located near the recipient.

The request time data 418 may indicate how the endpoint selection system 410 is to determine which device should be notified based on the time the communication request is received. The endpoint selection device 410 may determine the score 440 corresponding to the recipient device based on the request time data 418. For example, the request time data 418 may indicate that if the communication request is received at night (e.g., after 9 PM), then the devices located in the recipient's bedroom should be notified, since it is likely that the recipient is in the bedroom, and the score(s) 440 corresponding to the devices located in the bedroom may be higher compared to the other recipient devices. As another example, the request time data 418 may indicate that if the communication request is received in the morning (e.g., between 6 AM and 9 AM), then the devices located in the kitchen and/or bathroom may be notified, and the score(s) 440 corresponding to the devices located in the kitchen and bathroom may be higher compared to the other recipient devices. As another example, the request time data 418 may indicate that if the communication request is received on a workday during work hours then the recipient mobile devices should be notified, rather than the devices that typically remain in the recipient household, and the score(s) 440 corresponding to the mobile devices may be higher compared to the other recipient devices.

The device location data 420 may indicate how the endpoint selection system 410 is to determine which device should be notified based on the location of the recipient device. The endpoint selection device 410 may determine the score 440 corresponding to the recipient device based on the device location data 420. For example, the device location data 420 may indicate that if the communication request is received from a particular caller, such as a work contact, then the recipient devices located within the home office should be notified, and the score(s) 440 corresponding to the recipient devices located within the home office may be higher compared to the other recipient devices. As another example, if the communication request is received from a family contact then the devices in the family room or common areas should be notified so that any person in the household is able to hear/view the notification, and the score(s) 440 corresponding to the recipient devices located within the common areas may be higher compared to the other recipient devices. In some embodiments, the endpoint selection component 410 may determine which recipient device to notify based on the device location and the time the communication request is received.

The request type data 422 may indicate how the endpoint selection system 410 is to determine which device should be notified based on the type of communication request. The types of communication requests include, but are not limited to, audio two-way communication, video two-way communication, voice message, SMS, text message, email message, audio message, other types of asynchronous message, phone/VoIP/text synchronous message, etc. The endpoint selection device 410 may determine the score 440 corresponding to the recipient device based on the device's capability to receive the particular communication request. For example, if the communication request is for a two-way video call, then the recipient device capable of a video calls may have a higher score 440 compared to the other recipient devices that are not capable of performing video calls.

The user specific data 424 may indicate a recipient's behavior pattern in answering, ignoring or otherwise acknowledging incoming communication requests. The user specific data 424 may indicate which recipient device is often used by the recipient to acknowledge communication requests. The user specific data 424 may indicate which callee device is often used by the recipient to send communication requests (e.g., to make outbound calls or send messages to another user). The user specific data 424 may indicate which recipient device the recipient tends to ignore when notified of a communication request. The endpoint selection device 410 may determine the score 440 corresponding to the recipient device based on the user specific data 424. For example, the score 440 corresponding to the recipient device most often used by the recipient may be higher compared to other recipient devices. As another example, the score 440 corresponding to the recipient device that the recipient tends to ignore may be lower compared to the other recipient devices.

In some embodiments, the endpoint selection component 410 may determine the score for a recipient device based on the type of contact the sender of the communication is. For example, if the communication is sent by a personal contact of the recipient then the personal devices (e.g., mobile device, AR glasses, smart watch, etc.) associated with the recipient may be associated with a higher score than other type of devices that may be used or associated with other users (e.g., smart TV, a phone in the hallway, etc.).

The endpoint selection component 410 may use a machine learning model 430 to process some of the data, and may use a rule-based model to process the other data to determine the score(s) 440a-n. Each of the score 440 corresponds to a recipient device associated with the recipient/user 7. The score may represent a likelihood of the recipient acknowledging a communication request when received at the respective recipient device. For example, the higher score 440, the more likely the recipient is to acknowledge the communication request at that device. As described herein, the system(s) 125 uses the score 440 corresponding to the recipient device to determine which device to send the notification of the communication request. For example, the system(s) 125 may cause the device with the highest score 440 to output a notification first, since it is most likely that the recipient will acknowledge the request. After a duration of time elapses, the system(s) 125 may cause the next highest score 440 recipient device to output the notification, and so on.

The endpoint selection component 410 may determine, using the scores 440, a primary group of devices 450 and a secondary group of devices 452. The primary devices 450 may include recipient devices that have a score 440 that meets or is above a threshold value. The secondary devices 452 may include recipient devices that have a score 440 that is below the threshold value. The endpoint selection component 410 may also determine a tertiary group of devices. The endpoint selection component 410 may also determine a group of recipient devices that are not notified of the communication request, even when the recipient does not acknowledge the request via the other recipient devices that were notified.

Figure 5A:
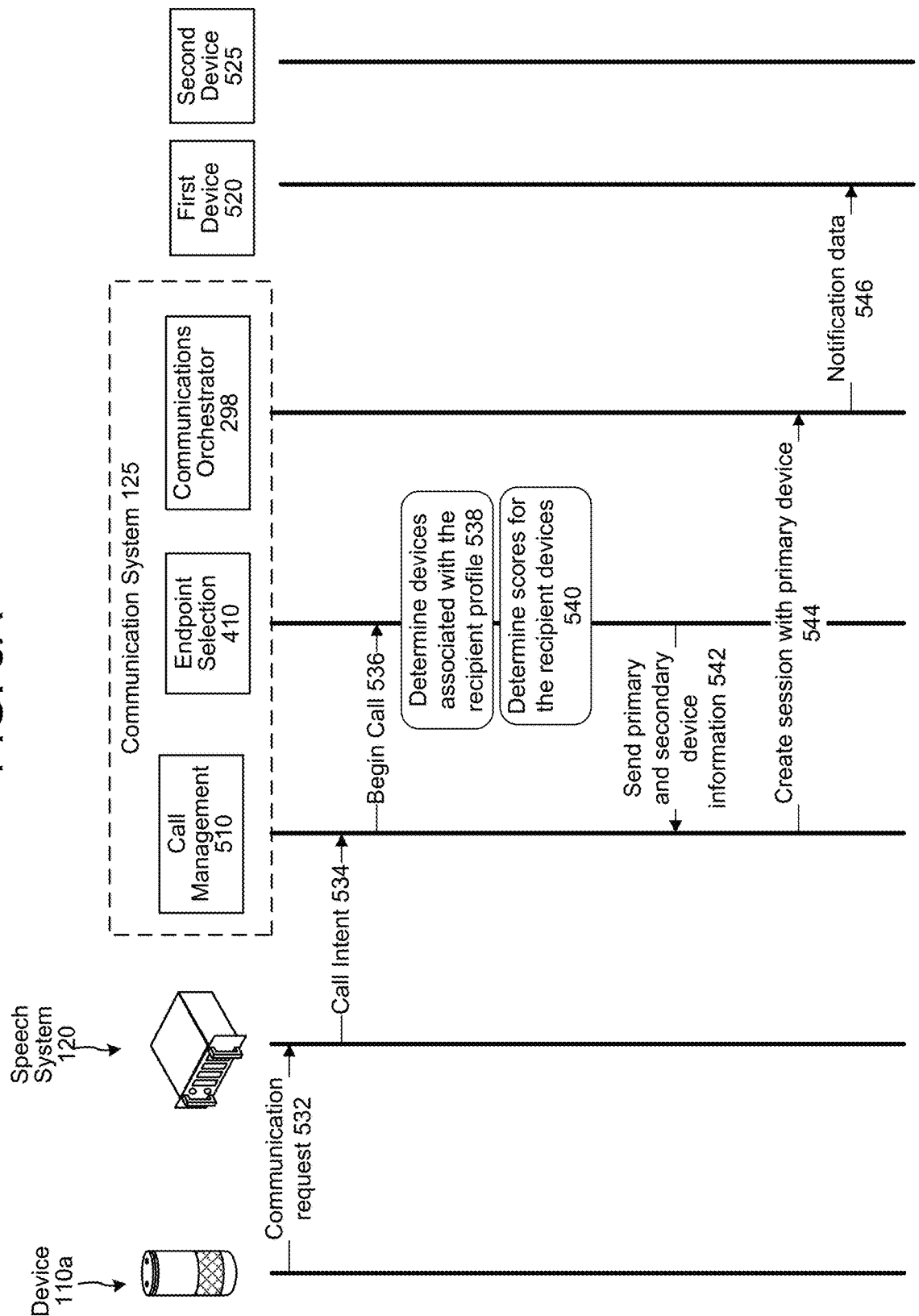

FIGS. 5A and 5B illustrate an example of signaling to incrementally send notifications to a recipient devices according to embodiments of the present disclosure. Referring to FIG. 5A, the speech system(s) 120 may receive (532) a request to establish communication from the caller's device 110a. The speech system(s) 120 may process the request using ASR and/or NLU to determine the caller's intent to call/communication with a recipient (e.g., user 7). The speech system(s) 120 may send (534) the communication request and indication of an intent to call to the communications system(s) 125, in particular to a call management component 510 of the communications system(s) 125. The call management component may send (536) an indication to begin/establish the call to the endpoint selection component 410 of the communications system(s) 125. The endpoint selection component 410 may determine (538) the devices associated with the recipient profile using data stored at profile storage 270b. The endpoint selection component 410 may determine (540) scores corresponding to each of the recipient devices, as described above in connection with FIG. 4.

In some embodiments, the endpoint selection component 410 may determine a primary recipient device or primary group of recipient devices and a secondary recipient device or secondary group of recipient devices based on the recipient devices' respective scores. For example, recipient devices with a score that are above or meet a threshold value may be included in the primary group, and the recipient devices with a score below the threshold value may be included in the secondary group. The endpoint selection component 410 may send (542) primary and secondary device information to the call management component 510.

The call management component 510 may create a session to identify and track the communication request from device 110a and may add the primary recipient device/primary group of recipient devices to the session. The call management component 510 may send (544) the session information, along with a session identifier, to the communication orchestrator 298. The communication orchestrator 298 may send (546) notification data to the first device 520. The first device 520 may be for example recipient device 110c and may be associated with the highest score of all the recipient devices. The notification data may cause the first device 520 to output a notification of the communication request from the device 110a.

Referring to FIG. 5B, after a duration of time elapses without the communication request being acknowledged, the call management component 510 may add (548) the secondary device (e.g., device 110b)/secondary group of devices to the session. The call management component 510 may send (550) an indication to the communications orchestrator 298 that the secondary recipient device/secondary group of recipient devices is added to the session. The communication orchestrator 298 may send (552) notification data to the second device 525. The second device 525 may be for example recipient device 110b and may be associated with the next highest score of all the recipient devices. The notification data may cause the second device 525 to output a notification of the communication request from the device 110a.

If the communication request is not acknowledged after the second device 525 outputs the notification for a duration of time, the system(s) 125 may cause additional devices associated with the recipient to output a notification of the communication request. In some embodiments, the system(s) 125 may cause all the devices associated with the recipient to output a notification until the recipient/user 7 acknowledges the request. In other embodiments, the system(s) 125 may cause the recipient devices to output a notification for a duration of time, and then inform the caller that the recipient is unavailable or otherwise did not acknowledge the request.

A user (e.g., user 7) may answer or accept the communication request using the first device 510 or the second device 525. In either case, the first device 520 or the second device 525 may send (554) an input from the user 7 to the speech system 120 indicating that the communication is activated. The speech system 120 may process the input and send (556) an instruction to the call management component 510 to establish the communication.

Figure 6:
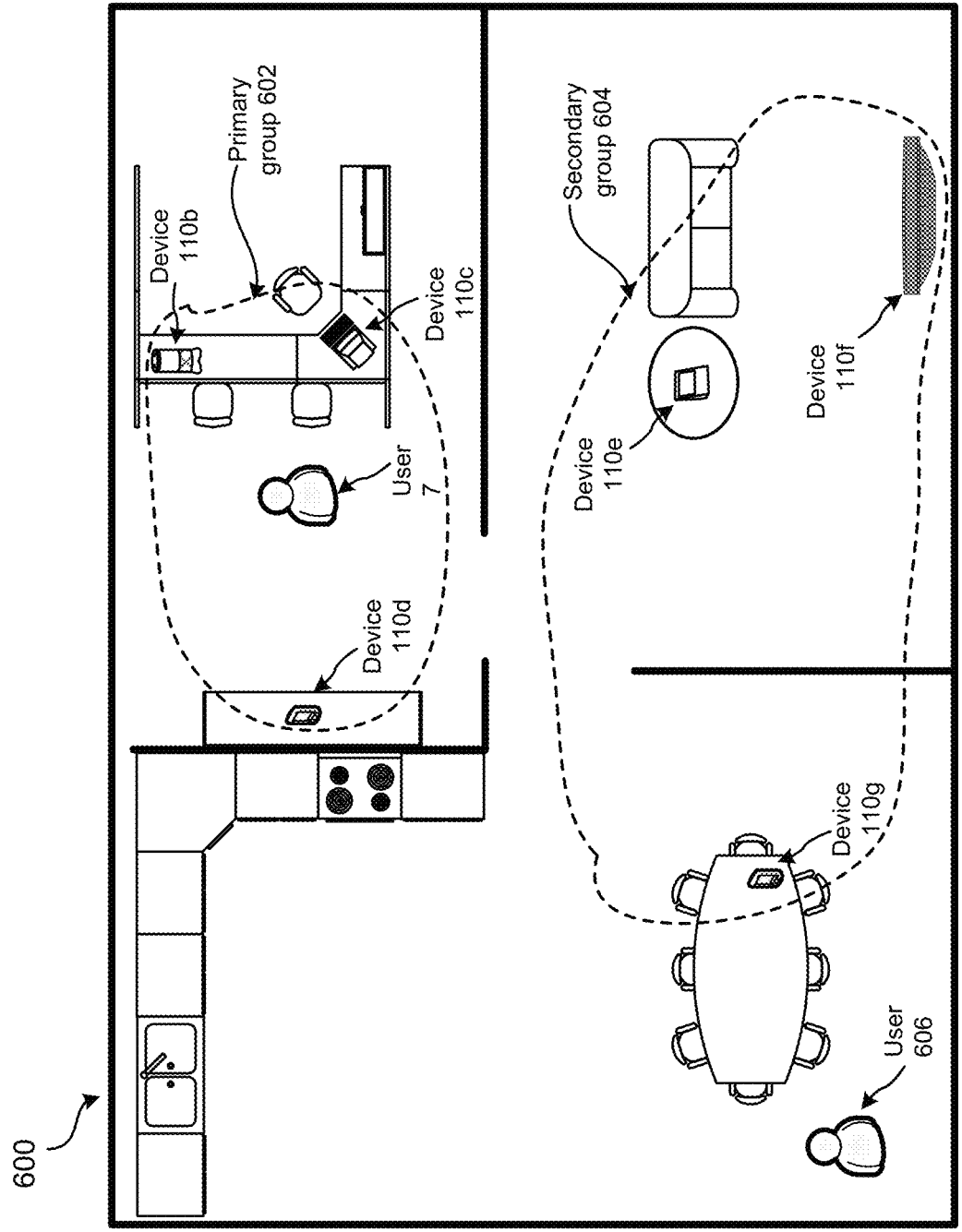
FIG. 6 illustrates how a user's devices can be categorized into groups for providing notifications.

FIG. 6 illustrates how a user's devices can be categorized into groups for providing notifications. As described herein, the communications system(s) 125 may determine a primary group of recipient devices and a secondary recipient devices to output notifications of an incoming communication request. The primary and secondary groups may be formed based on scores determined by the system(s) 125 for each of the recipient devices. FIG. 6 illustrates an example household of a recipient/user 7. As shown, the household may include multiple devices 110b-110g, each of which may be associated with the user 7 (and some may be associated with the user 606 also). As described herein, the scores corresponding to the recipient devices may be based on a likelihood of the recipient acknowledging an incoming communication request. For example, the score may be based on presence data indicating the recipient devices that the user 7 is proximate to. As shown in FIG. 6, the system(s) 125 may determine the primary group of recipient devices as including the devices 110b, 110c, and 110d, and may determine the secondary group of recipient devices as including the devices 110e, 110f, and 110g. The system(s) 125 may cause one or more of the primary group devices to output a notification of an incoming communication request for a duration of time. If the request is not acknowledged after the duration of time elapses, the system(s) 125 may cause one or more of the secondary group devices to output a notification of the incoming communication request.

Figure 7:
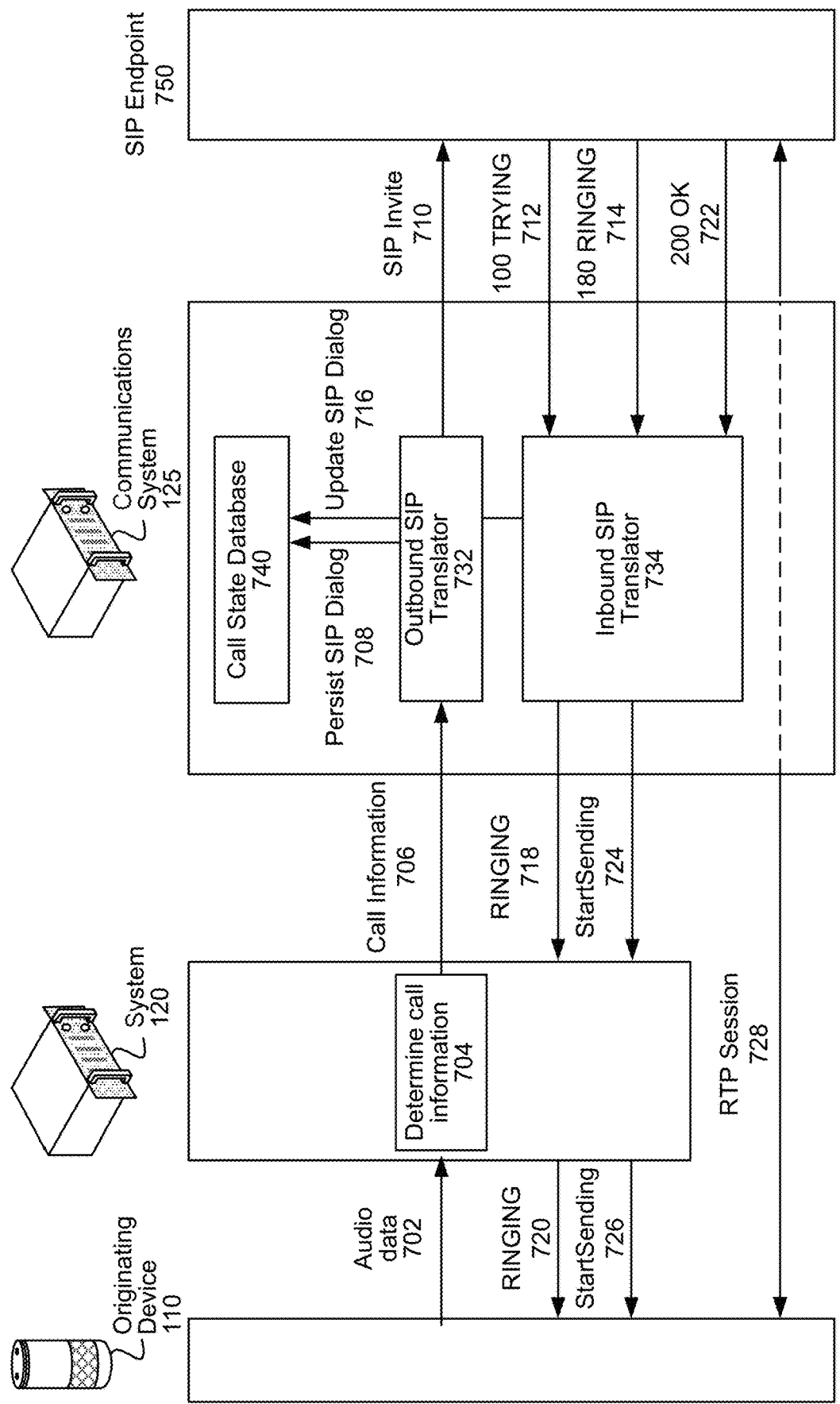
FIG. 7 illustrates an example of signaling to initiate a communication session according to embodiments of the present disclosure.

FIGS. 7, 8A, 8B, 9A, and 9B illustrate components that can be used to coordinate communications using a system such as that described herein. FIG. 7 illustrates an example of signaling to initiate a communication session according to the present disclosure. In one example, the system 120 is configured to enable voice commands (e.g., perform ASR, NLU, etc. to identify a spoken command included in audio data), whereas the communications system 125 is configured to enable communication sessions (e.g., using session initiation protocol (SIP)). For example, the communications system 125 may send SIP messages to endpoints (e.g., recipient devices) in order to establish a communication session for sending and receiving audio data and/or video data. The communication session may use network protocols such as real-time transport protocol (RTP), RTP Control Protocol (RTCP), Web Real-Time communication (WebRTC), and/or the like. For example, the communications system 125 may send SIP messages to initiate a single RTP media stream between two endpoints (e.g., direct RTP media stream between the originating device 110 and a recipient device) and/or to initiate and facilitate RTP media connections between the two endpoints (e.g., RTP media streams between the originating device 110 and the communications system 125 and between the communications system 125 and a recipient device). During a communication session, the communications system 125 may initiate two media streams, with a first media stream corresponding to audio data sent from the originating device 110 and to the recipient device and a second media stream corresponding to audio data sent from the recipient device and to the originating device 110, although for ease of explanation this may be illustrated as a single RTP media stream.

As illustrated in FIG. 7, the originating device 110 may send (702) audio data to the system 120 and the system 120 may determine (704) call information using the audio data and may send (706) the call information to the communications system 125 (e.g., via the communications skill 290a). The system 120 may determine the call information by performing ASR, NLU, etc., as discussed herein, and the call information may include a data source name (DSN), a number from which to call, a number to which to call, encodings, and/or additional information. For example, the system 120 may identify from which phone number the originating user would like to initiate the call, to which phone number the originating user would like to initiate the call, from which device 110 the originating user would like to perform the call, etc.

While FIG. 7 illustrates the system 120 sending the call information to the communications system 125 in a single step (e.g., 706), the present disclosure is not limited thereto. Instead, the system 120 may send the call information to the originating device 110 and the originating device 110 may send the call information to the communications system 125 in order to initiate the call without departing from the present disclosure. Thus, the system 120 may not communicate directly with the communications system 125 in step 706, or may instead instruct the originating device 110 to communicate with the communications system 125 in order to initiate the call.

The communications system 125 may include an outbound SIP translator 732, an inbound SIP translator 734, and a call state database 740. The outbound SIP translator 732 may include logic to convert commands received from the system 120 into SIP requests/responses and may handle sending outgoing SIP requests and sending responses to incoming SIP requests. After receiving the call information, the outbound SIP translator 732 may persist (708) a SIP dialog using the call state database 740. For example, the DSN may include information such as the name, location, and driver associated with the call state database 740 (and, in some examples, a user identifier and password of the originating user) and the outbound SIP translator 732 may send a SIP dialog to the call state database 740 regarding the communication session. The call state database 740 may persist the call state if provided a device identifier and one of a call identifier or a dialog identifier. The outbound SIP translator 732 may send (710) a SIP Invite to a SIP Endpoint 750 (e.g., a recipient device, a Session Border Controller (SBC), or the like). While one SIP Endpoint 750 is illustrated, one skilled in the art will appreciate that SIP invites may be sent to more than one SIP Endpoint 750.

The outbound SIP translator 732 may send the SIP Invite to a separate communications system, such as a cellular service provider. The cellular service provider may send the SIP invite to the SIP Endpoint 750. It will thus be appreciated that a cellular service provider (or other communications modality provider) may act as an intermediary between the communications system 125 and an SIP Endpoint 750. Various APIs or other components may be used to exchange messages across different communication systems.

The inbound SIP translator 734 may include logic to convert SIP requests/responses into commands to send to the system 120 and may handle receiving incoming SIP requests and incoming SIP responses. The SIP endpoint 750 may send (712) a 100 TRYING message to the inbound SIP translator 734 and may send (714) a 180 RINGING message to the inbound SIP translator 734. The inbound SIP translator 1234 may update (716) the SIP dialog using the call state database 740 and may send (718) a RINGING message to the system 120, which may send (720) the RINGING message to the originating device 110. Alternatively, the inbound SIP translator 734 may send the RINGING message to the originating device 110 without using the system 120 as an intermediary.

When the communication session is accepted by the SIP endpoint 750, the SIP endpoint 750 may send (722) a 200 OK message to the inbound SIP translator 734, the inbound SIP translator 745 may send (724) a startSending message to the system 120, and the system 120 may send (726) the startSending message to the originating device 110. Alternatively, the inbound SIP translator 734 may send the startSending message to the originating device 110 without using the system 120 as an intermediary. The startSending message may include information associated with an internet protocol (IP) address, a port, encoding, or the like required to initiate the communication session. Using the startSending message, the originating device 110 may establish (728) an RTP communication session with the SIP endpoint 750 via the communications system 125. The RTP session may be referred to as direct audio communication functionality as speech captured by one device of the RTP session may be sent as audio data to another device of the RTP session, which outputs the speech to a recipient user.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data, and/or any other multimedia data without departing from the disclosure.

Figure 8A:
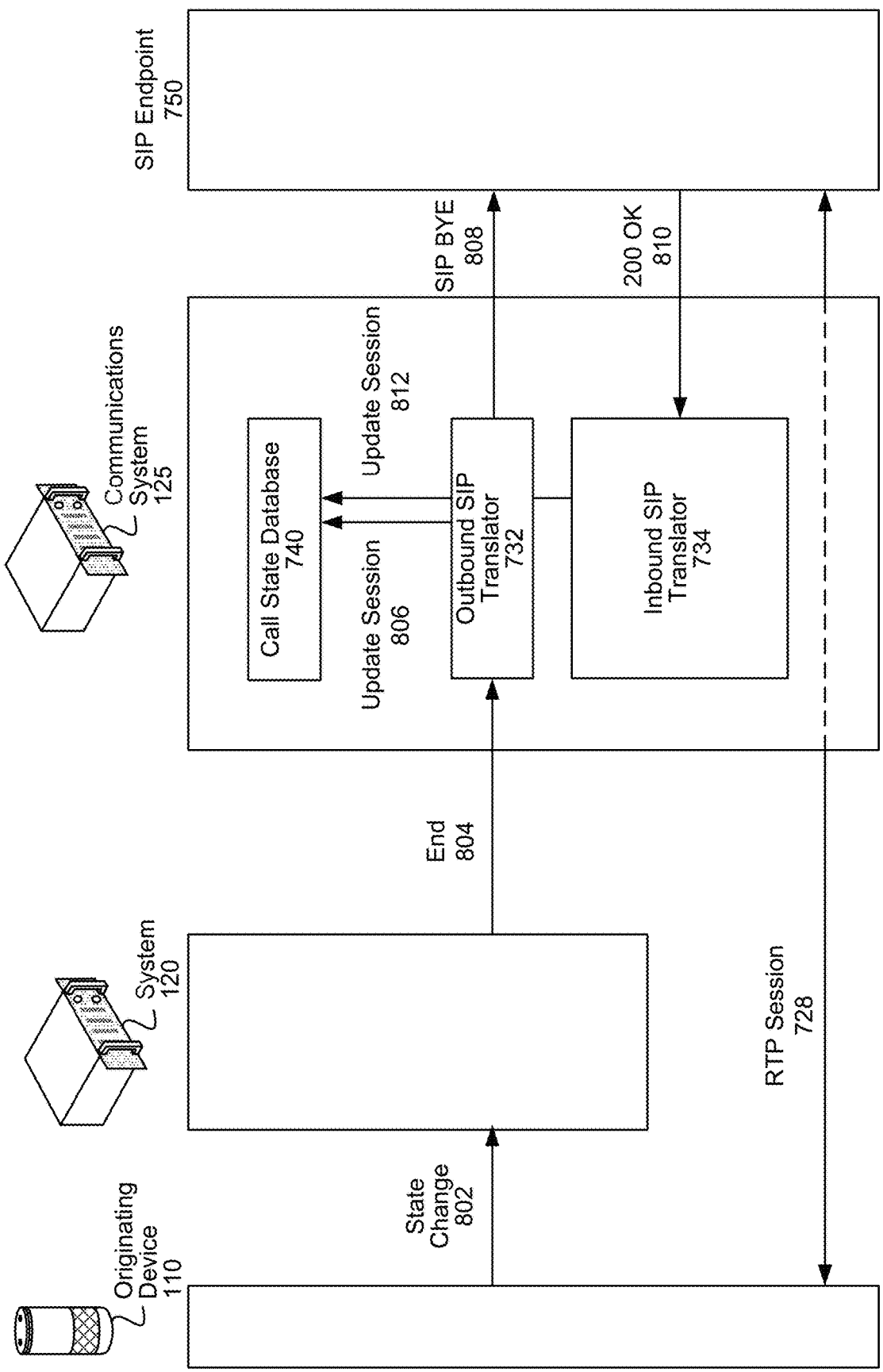
FIGS. 8A and 8B illustrate examples of signaling to end a communication session according to embodiments of the present disclosure.
Figure 8B:
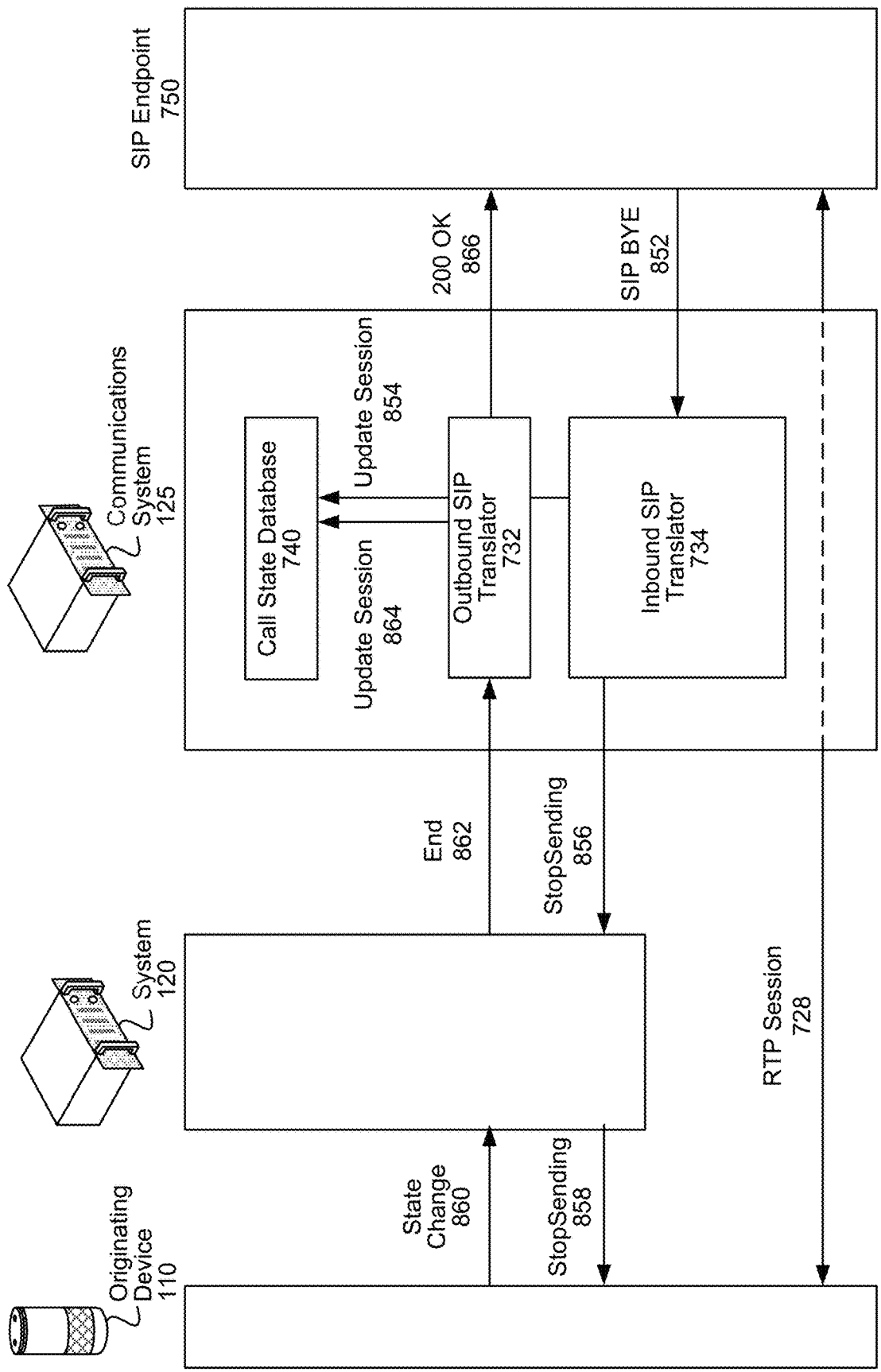

FIGS. 8A and 8B illustrate examples of signaling to end a communication session according to the present disclosure. After establishing the RTP communication session 728 between the originating device 110 and the SIP endpoint 1250, the RTP communication session may be ended by the originating user inputting a command, to end the call, to the originating device 110, as illustrated in FIG. 8A, or a recipient user inputting a command, to end the call, to the SIP endpoint 750, as illustrated in FIG. 8B.

As illustrated in FIG. 8A, the originating device 110 may send (802) a state change message to the system 120 and the system 120 may send (804) an end message to the communications system 125. The outbound SIP translator 732 may update (806) the session using the call state database 740 and may send (808) a SIP BYE message to the SIP endpoint 750. The SIP endpoint 750 may send (810) a 200 OK message to the inbound SIP translator 734 and the inbound SIP translator 734 may update (812) the session using the call state database 740. In some examples, the inbound SIP translator 734 may send the 200 OK message to the originating device 110 to confirm the communication session has been ended. Thus, the RTP communication session 728 may be ended between the originating device 110 and the SIP endpoint 750.

As illustrated in FIG. 8B, the SIP endpoint 750 may send (852) a SIP BYE message to the inbound SIP translator 734 and the inbound SIP translator 734 may update (854) the session using the call state database 740. The inbound SIP translator 734 may send (856) a stopSending message to the system 120 and the system 120 may send (858) the stopSending message to the originating device 110. The originating device 110 may send (860) a state change message to the system 120 and the system 120 may send (862) an End message to the outbound SIP translator 732, the End message including a DSN. The outbound SIP translator 732 may then update (864) the session using the call state database 740, and send (866) a 200 OK message to the SIP endpoint 7 50. Thus, the RTP communication session 728 may be ended between the originating device 110 and the SIP endpoint 750.

While FIGS. 8A and 8B illustrate the system 120 acting as an intermediary between the originating device 110 and the communications system 125, the present disclosure is not limited thereto. Instead, steps 802 and 804 may be combined into a single step and the originating device 110 may send the state change message and/or the End message to the communications system 125 without using the system 120 as an intermediary. Similarly, steps 766 and 758 may be combined into a single step and the communications system 125 may send the StopSending message to the originating device 110 without using the system 120 as an intermediary, and/or steps 860 and 862 may be combined into a single step and the originating device 110 may send the state change message and/or the End message to the communications system 125 without using the system 120 as an intermediary.

While FIGS. 7, 8A, and 8B illustrate the RTP communication session 728 being established between the originating device 110 and the SIP endpoint 750, the present disclosure is not limited thereto and the RTP communication session 728 may be established between the originating device 110 and a telephone network associated with the SIP endpoint 750 without departing from the present disclosure.

Figure 9A:
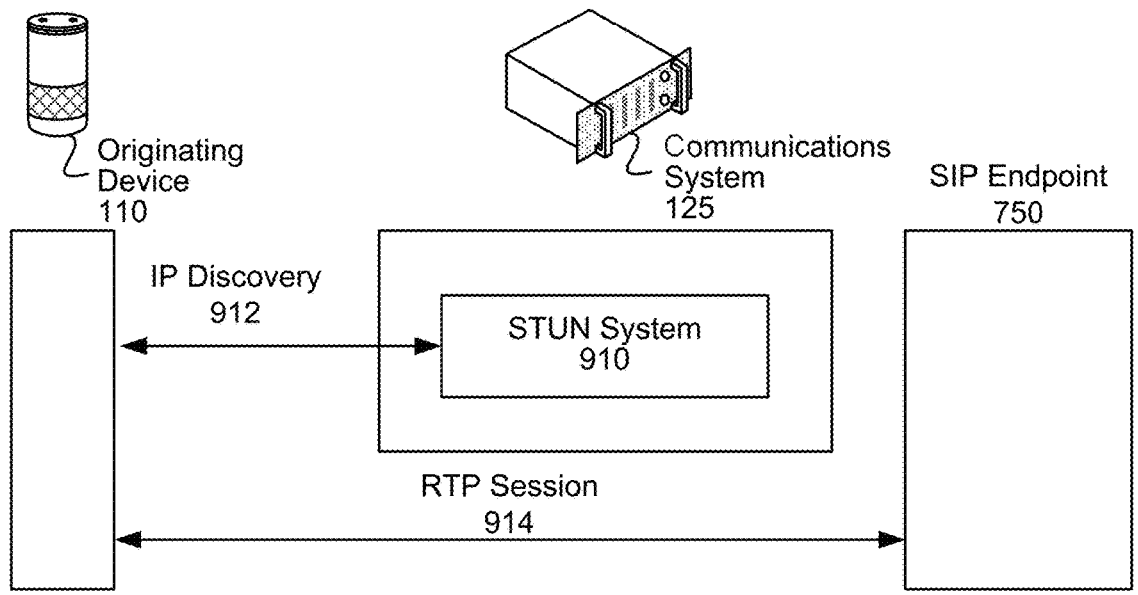
FIGS. 9A and 9B illustrate examples of establishing media connections between devices according to embodiments of the present disclosure.
Figure 9B:
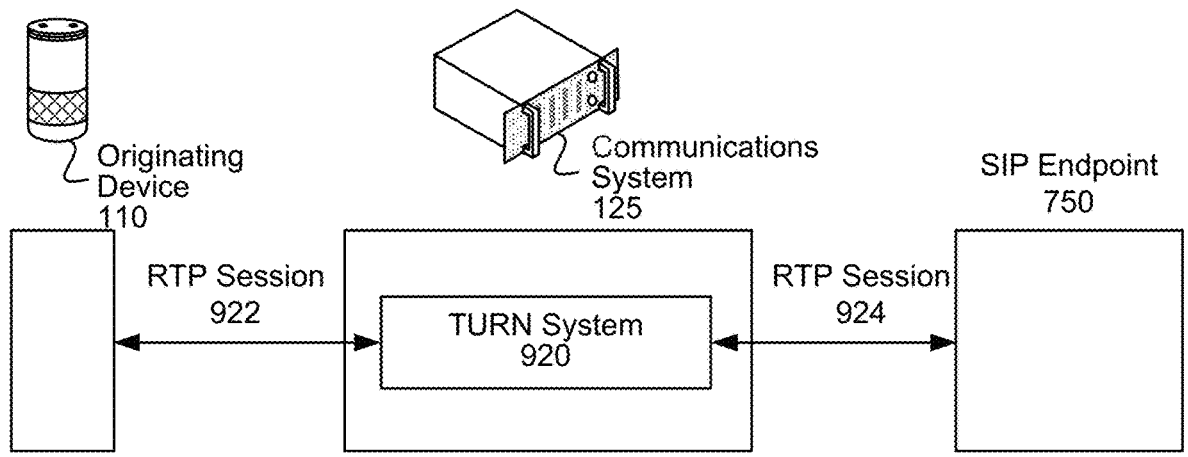

FIGS. 9A and 9B illustrate examples of establishing media connections between devices according to the present disclosure. In some examples, the originating device 110 may have a publicly accessible IP address and may be configured to establish the RTP communication session directly with the SIP endpoint 750. To enable the originating device 110 to establish the RTP communication session, the communications system 125 may include Session Traversal of User Datagram Protocol (UDP) Through Network Address Translators (NATs) system (e.g., STUN system 910). The STUN system 910 may be configured to allow NAT clients (e.g., an originating device 110 behind a firewall) to setup calls to a VoIP provider hosted outside of the local network by providing a public IP address, the type of NAT they are behind, and a port identifier associated by the NAT with a particular local port. As illustrated in FIG. 9A, the originating device 110 may perform (912) IP discovery using the STUN system 910 and may use this information to set up an RTP communication session 914 (e.g., UDP communication) between the originating device 110 and the SIP endpoint 750 to establish a call.

In some examples, the originating device 110 may not have a publicly accessible IP address. For example, in some types of NAT the originating device 110 cannot route outside of the local network. To enable the originating device 110 to establish an RTP communication session, the communications system 125 may include Traversal Using relays around NAT (TURN) system 920. The TURN system 920 may be configured to connect the originating device 110 to the SIP endpoint 750 when the originating device 110 is behind a NAT. As illustrated in FIG. 9B, the originating device 110 may establish (922) an RTP session with the TURN system 1420 and the TURN system 1420 may establish (1424) an RTP session with the SIP endpoint 1250. Thus, the originating device 110 may communicate with the SIP endpoint 750 via the TURN system 920. For example, the originating device 110 may send audio data to the communications system 125 and the communications system 125 may send the audio data to the SIP endpoint 750. Similarly, the SIP endpoint 750 may send audio data to the communications system 125 and the communications system 125 may send the audio data to the originating device 110.

In some examples, the system may establish communication sessions using a combination of the STUN system 910 and the TURN system 920. For example, a communication session may be more easily established/configured using the TURN system 920, but may benefit from latency improvements using the STUN system 910. Thus, the system may use the STUN system 910 when the communication session may be routed directly between two devices and may use the TURN system 920 for all other communication sessions. Additionally or alternatively, the system may use the STUN system 910 and/or the TURN system 920 selectively based on the communication session being established. For example, the system may use the STUN system 910 when establishing a communication session between two devices (e.g., point-to-point) within a single network (e.g., corporate LAN and/or WLAN), but may use the TURN system 920 when establishing a communication session between two devices on separate networks and/or three or more devices regardless of network(s). When the communication session goes from only two devices to three or more devices, the system may need to transition from the STUN system 910 to the TURN system 920. Thus, if the system anticipates three or more devices being included in the communication session, the communication session may be performed using the TURN system 920. When the communication session goes from three or more devices to only two devices, the system may need to transition from the TURN system 920 to the STUN system 910.

Figure 10:
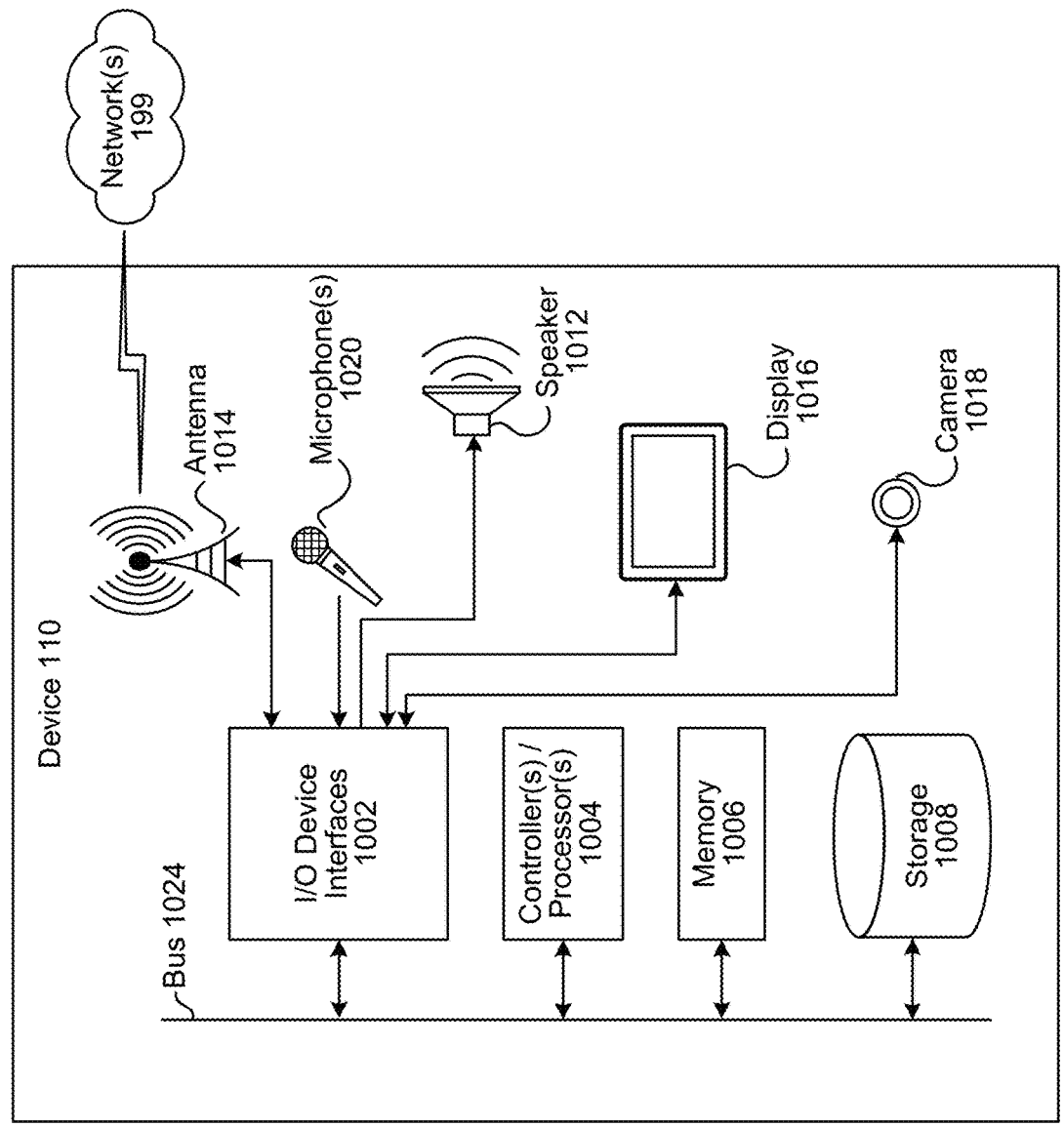
FIG. 10 is a block diagram conceptually illustrating example components of a device according to embodiments of the present disclosure.

FIG. 10 is a block diagram conceptually illustrating a device 110 that may be used with the system. FIG. 11 is a block diagram conceptually illustrating example components of the system 120, which may be one or more servers and which may assist with ASR processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing ASR processing, one or more servers for performing NLU processing, etc. In operation, each of these server (or groups of devices) may include computer-readable and computer-executable instructions that reside on the respective server, as will be discussed further below.

Each of these devices/systems (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device/system (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device/system (110/120/125) includes input/output device interfaces (1002/1102). A variety of components may be connected through the input/output device interfaces (1002/1102), as will be discussed further below. Additionally, each device (110/120/125) may include an address/data bus (1024/1124) for conveying data among components of the respective device. Each component within a device (110/120/125) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical systems in a collection of systems or other components.

The components of the device(s) 110, the system 120, of the communications system 125 may include their own dedicated processors, memory, and/or storage. Alternatively, one or more of the components of the device(s) 110, the system 120, or the communications system 125 may utilize the I/O interfaces (1002/1102), processor(s) (1004/1104), memory (1006/1106), and/or storage (1008/1108) of the device(s) 110 system 120, or the communications system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and the communications system 125, as described herein, are illustrative, and may be located as a stand-alone device or may be included, in whole or in part, as a component of a larger device or system.

As illustrated in FIG. 12, multiple devices (110a-110i, 120, 125) may contain components of the system, and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, augmented reality (AR) glasses 110h, and/or headphones 110i may be connected to the network(s) 199 through a wireless service provider, over a WiFi or cellular network connection, or the like. Any of the devices 110 may be first devices or second devices 520, 525 depending on the system configuration. Other devices are included as network-connected support devices, such as the system 120, the communications system 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments. The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
  receiving a request to establish communication with a user associated with a user profile;
  determining the user profile is associated with a first device and a second device;
  determining first data using a first Bluetooth beacon located proximate to the first device;
  determining second data using a first motion sensor located proximate to the first device;
  determining a first score based at least in part on the first data and the second data, the first score indicating a likelihood of the user being proximate to the first device;
  based at least in part on the first score, causing the first device to output, for a duration of time, a first notification corresponding to the request; and
  after the duration of time has elapsed, causing the second device to output a second notification corresponding to the request.

2. The computer-implemented method of claim 1, further comprising:
  receiving a request to establish communication with the user associated with the first device;
  determining a location of the first device;
  determining a receipt time indicating when the request is received; and
  determining the first score based on at least one of the location and the receipt time.

3. The computer-implemented method of claim 1, further comprising:
  determining a first number representing a number of past communication requests established with the first device;

determining a second number representing a number of past communication requests received from the first device;
determining a third number representing a number of past communication requests unanswered at the first device; and
determining the first score based on at least one of the first number, the second number and the third number.

4. The computer-implemented method of claim 1, further comprising:
associating the request with a session identifier; and
associating the first device and the second device with the session identifier.

5. The computer-implemented method of claim 1, further comprising:
determining third data using a second Bluetooth beacon located proximate to the second device;
determining fourth data using a second motion sensor located proximate to the second device; and
determining a second score based at least in part on the third data and the fourth data, the second score indicating a likelihood of the user being proximate to the second device.

6. The computer-implemented method of claim 5, further comprising:
based on the first score and the second score, determining a group of devices including the first device and the second device.

7. The computer-implemented method of claim 5, further comprising:
receiving, from a caller profile, a request to establish communication with the user in a household;
determining user preference data indicating the request from the caller profile can be answered by a group of user profiles;
determining the first device and the second device associated with the group of user profiles; and
sending notification data corresponding to the request to the first device and the second device.

8. The computer-implemented method of claim 1, further comprising:
receiving, from the first device, audio data;
determining speaker identity data indicating that the audio data represents speech from the user; and
determining the first score based at least in part on the speaker identity data.

9. The computer-implemented method of claim 1, further comprising:
determining notification data for a notification for the user profile associated with the user; and
based on the first score, sending the notification data to the first device.

10. The computer-implemented method of claim 1, further comprising:
determining third data indicating the first device is connected to a network; and
determining the first score based at least in part on the third data.

11. The computer-implemented method of claim 1, further comprising:
determining the first data is associated with a device identifier; and
determining the device identifier is associated with a user identifier for the user.

12. The computer-implemented method of claim 1, further comprising:
determining the first device is associated with a user identifier for the user.

13. A system comprising:
at least one processor; and
at least one memory including instructions that, when executed by the at least one processor, cause the system to:
receive a request to establish communication with a user associated with a user profile;
determine the user profile is associated with a first device and a second device;
determine first data using a first Bluetooth beacon located proximate to the first device;
determine second data using a first motion sensor located proximate to the first device;
determine a first score based at least in part on the first data and the second data, the first score indicating a likelihood of the user being proximate to the first device;
based at least in part on the first score, cause the first device to output, for a duration of time, a first notification corresponding to the request; and
after the duration has elapsed, cause the second device to output a second notification corresponding to the request.

14. The system of claim 13, wherein the instructions that, when executed by the at least one processor, further causes the system to:
determine a location of the first device;
determine a receipt time indicating when the request is received; and
determine the first score based on at least one of the location and the receipt time.

15. The system of claim 13, wherein the instructions that, when executed by the at least one processor, further cause the system to:
determine third data using a second Bluetooth beacon located proximate to the second device;
determine fourth data using a second motion sensor located proximate to the second device; and
determine a second score based at least in part on the third data and the fourth data, the second score indicating a likelihood of the user being proximate to the second device.

16. The system of claim 15, wherein the instructions that, when executed by the at least one processor, further cause the system to:
based on the first score and the second score, determine a group of devices including the first device and the second device.

17. The system of claim 15, wherein the instructions that, when executed by the at least one processor, further cause the system to:
receive, from a caller profile, a request to establish communication with the user in a household;
determine user preference data indicating the request from the caller profile can be answered by a group of user profiles;
determine the first device and the second device associated with the group of user profiles; and
send notification data corresponding to the request to the first device and the second device.

18. The system of claim 13, wherein the instructions that, when executed by the at least one processor, further cause the system to:

determine a first number representing a number of past communication requests established with the first device;

determine a second number representing a number of past communication requests received from the first device;

determine a third number representing a number of past communication requests unanswered at the first device; and determine the first score based at least in part on one of the first number, the second number and the third number.

19. The system of claim 13, wherein the instructions that, when executed by the at least one processor, further cause the system to:

determine notification data for the first notification for the user profile; and based on the first score, send the notification data to the first device.

20. A computer-implemented method comprising:

receiving a request to establish communication with a user associated with a user profile;

determining the user profile is associated with a first device and a second device;

associating the request with a session identifier;

associating the first device and the second device with the session identifier;

determining a first score indicating a likelihood of the user being proximate to the first device;

determining a second score indicating a likelihood of the user being proximate to the second device;

based at least in part on the first score and the second score, causing the first device to output, for a duration of time, a first notification corresponding to the request;

after the duration of time has elapsed, determining that no user input was received from the first device; and causing the second device to output a second notification corresponding to the request based at least in part on:
the first score and the second score,
determining that no user input was received from the first device after the duration of time has elapsed, and
the first device and the second device being associated with the session identifier.

21. The computer-implemented method of claim 20, further comprising:

determining a location of the first device;

determining a receipt time indicating when the request is received; and determining the first score based on at least one of the location and the receipt time.

\* \* \* \* \*